United States Patent [19]

Castriotta et al.

[11] 4,220,824
[45] Sep. 2, 1980

[54] INTERFACE LINKING SYNCHRONOUS SENSE AND DRIVE MATRICES OF TELEPHONE SYSTEM WITH A PROCESSOR OF SIGNALIZATION DATA

[75] Inventors: Michele Castriotta; Spiridione De Micheli, both of Turin, Italy

[73] Assignee: CSELT - Centro Studi e Laboratori Telecomunicazioni S.p.A., Turin, Italy

[21] Appl. No.: 886,526

[22] Filed: Mar. 14, 1978

[30] Foreign Application Priority Data

Mar. 14, 1977 [IT] Italy ................................ 67551 A/77

[51] Int. Cl.² .............................................. H04Q 3/56
[52] U.S. Cl. ............................. 179/18 J; 179/18 ES; 179/18 FG
[58] Field of Search ............. 179/18 ES, 18 J, 18 FG, 179/18 FF

[56] References Cited

U.S. PATENT DOCUMENTS

| 3,576,399 | 4/1971 | Schweitzer et al. | 179/18 FG |
| 3,806,887 | 4/1974 | Schulte et al. | 179/18 ES X |
| 3,909,542 | 9/1975 | Wunluck et al. | 179/18 ES X |
| 4,041,465 | 8/1977 | Conerly | 179/18 FG X |

*Primary Examiner*—Thomas W. Brown
*Attorney, Agent, or Firm*—Karl F. Ross

[57] ABSTRACT

Sensors SE and drivers AT electrically linked to various points of communication equipment, e.g. in a telephone system, are periodically explored by an interface linking them with a processor, under the control of a time base successively reading out their addresses during synchronous phases of respective time slots of a recurrent frame also having other phases set aside for the asynchronous exchange of data with the processor. The interface comprises a first and a second read/write memory $ME_1$, $ME_2$ respectively storing information relating to the evaluation of incoming signals from the sensors and to the sending of outgoing signals to the drivers, the contents of these memories being updated from time to time during asynchronous phases allocated to communication with the processor. The evaluation of incoming signals is performed in a first logic network IN, with the aid of integrating circuitry including a read-only memory $ROM_1$ inserted in a feedback loop of the incoming-signal memory $ME_1$; the forwarding of change-of-state signals from this logic network IN to the processor may be inhibited in selected instances by masking criteria stored in the incoming-signal memory $ME_1$ which can be modified, on instructions received from the processor, with the aid of a second logic network LM including another read-only memory $ROM_3$ also inserted in a feedback loop of memory $ME_1$.

10 Claims, 4 Drawing Figures

INTERFACE LINKING SYNCHRONOUS SENSE AND DRIVE MATRICES OF TELEPHONE SYSTEM WITH A PROCESSOR OF SIGNALIZATION DATA

FIELD OF THE INVENTION

Our present invention relates to data-processing devices, and more particularly to an interface between a plurality of sense and/or drive matrices used in telephone signalization and an apparatus for processing data represented by such signalization.

BACKGROUND OF THE INVENTION

As is known, in telecommunication systems such as telephone networks it is often required to collect signalization data from numerous circuit points in the network, in order to send them to a computer so that they may be processed as required, and possibly to return to such points other data resulting from processing operations. Examples include switching operations in a computer-controlled exchange, automated traffic and fault documentation and recording, exchange supervision and control, or charging operations.

In all the above cases, data collection requires a number of simple and repetitive operations, e.g. exploring the circuit points to detect state transitions, whereas the effective sophisticated processing operations are very few and so less frequent.

The computer cannot be entrusted with the above-mentioned repetitive operations for various reasons. First of all, transition recognition requires the sampling of signals at frequencies that, for a large number of points to be checked, are incompatible with the speed of operation of an asynchronous system, i.e. of a programmed sequential-logic apparatus such as a computer. Moreover, this would impair the availability of the processor for more sophisticated tasks required in carrying out the procedures involving those points. Finally, it is complicated to connect to a computer all the wires on which signalization data are present or to which they are to be sent. Therefore, generally, preprocessing units performing all repetitive operations and supplying the computer with more significant information (such as a state transition at a point) are placed between the processor and the devices which physically detect circuit conditions, i.e. sensors, or send back control signals, i.e. drivers. In this way, only the more sophisticated tasks are left to the computer.

Before microprocessors became commercially available, it seemed attractive to use centralized preprocessing units with high processing capability, operating synchronously by having a suitable time slot allotted to each device to be checked during the operating cycle of the preprocessor. In this way, data losses could be avoided and, besides, sensors and drivers could effect a time multiplexing or demultiplexing of the signals present at their inputs. These sensors and drivers couould be decentralized near the circuit points from which signals were to be collected or to which signals were to be sent; moreover, the connection between peripheral parts and centralized parts required only a limited number of wires. Furthermore, the dialogue between the two parts was minimized, as each piece of information could be detected by its time position, and so the peripheral units could have a rather simple structure.

Commercial availability of microprocessors changed the approach to the problem; their lower processing power and their lower cost have made it attractive to utilize them not only as centralized processors of preprocessed data but also as asynchronous peripheral processors associated with a number of sensor and driver sets and able to send preprocessed data to a centralized computer with greater processing power.

However, even if a preprocessing unit of this kind operates naturally asynchronously, it is convenient to maintain the synchronous structure of peripheral sets of sensors and/or drivers to preserve the features of simple and limited dialogue with the preprocessing unit and to make it possible to decentralize these sets with respect to their preprocessing unit.

Yet this new preprocessing technique presents the problem of adapting a frame of synchronous signals so that it can be received and processed by a bascially asynchronous device such as a processor.

OBJECT OF THE INVENTION

The object of our present invention, therefore, is to provide an interface linking the sensors and drivers with an associated processor or computer while relieving the latter of some of the tasks conventionally performed by it.

SUMMARY OF THE INVENTION

An interface according to our invention comprises an incoming-signal memory with sections which are respectively identified by address codes read out from a time base in a recurrent operating cycle, these sections serving for the storage of evaluation criteria, such as integration and masking codes, pertaining to corresponding signal samples obtained from the associated sensors upon the scanning thereof in respective time slots of the operating cycle. Logical circuitry connected to the incoming-signal memory and to the sensors receives these signal samples, evaluates them on the basis of the stored criteria and converts them into change-of-state signals which are transmitted to the processor. The logical circuitry further includes updating means connected to the processor for modifying the stored evaluation criteria.

According to a further feature of our invention, an address input of the incoming-signal memory is connected by switchover means such as a multiplexer, controlled by the time base, to an output of that time base carrying the aforementioned address code during one phase of each time slot, termed a synchronous phase, and to an address channel of the processor during another, asynchronous phase thereof. The contents of a selected section of the memory can be read directly by the processor during the asynchronous phase.

Pursuant to a more particular feature of our invention, the logical circuitry referred to above comprises an integration-code storeinserted in a first feedback loop and a masking-code store inserted in a second feedback loop of the incoming-signal memory. The two stores are advantageously designed as read-only memories.

In accordance with yet another feature of our invention, an outgoing-signal memory is controlled by the same switchover means as the incoming-signal memory so as to be loaded with operating instructions during asynchronous phases in sections identified by the address channel of the processor, these instructions being then communicated to associated drivers whose addresses are read out by the time base during synchronous phases.

The incoming-signal and outgoing-signal memories are advantageously part of a central memory included in the processor or computer.

BRIEF DESCRIPTION OF THE DRAWING

The above and other features of our invention will now be described in detail with reference to the accompanying drawing in which.

SPECIFIC DESCRIPTION

Figure 1:
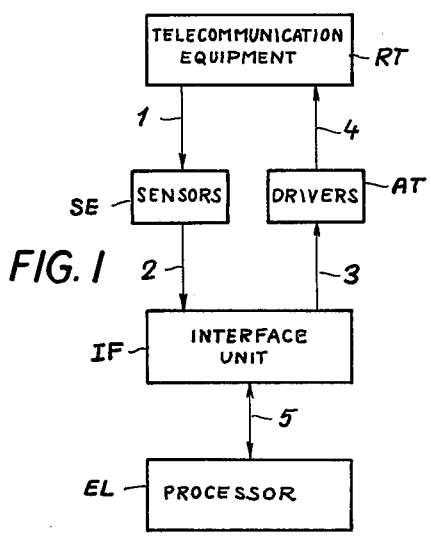
FIG. 1 is a block diagram of a computer-controlled system utilizing an interface according to our invention.

In FIG. 1 we have shown at RT a set of circuits in telecommunication equipment, e.g. in a telephone system. Signalization data, in the form of presence or of absence of direct current, pass along these circuits toward a computer EL where they are to be processed; in addition, the circuits of equipment RT must receive from computer EL analogous signalization data as a result of such processing.

An assembly or matrix of sensors SE serves to extract these signalization data from various scanned points of equipment RT via a connection schematically represented by a line 1.

Sensor assembly SE is designed to explore, according to time-division techniques, all points of equipment RT connected thereto and to emit, via a connection 2, serialized incoming frames of samples of the detected data. These incoming frames each comprise as many time slots as there are sensors in assembly SE. Generally, a sensor will be provided for every scanned point; however, in case some particular points are to be explored more often, each of them can be associated with more than one properly located sensor.

Assembly SE can consist, for instance, of one or more devices of the type described in commonly owned application Ser. No. 769,270 filed Feb. 11, 1977 by one of us, Spiridione De Micheli.

Reference AT denotes an assembly or matrix of drivers designed to send to controlled points of equipment RT, to which they are connected via links represented by a line 4, signalization data generated by computer EL, received by assembly AT through a connection 3. Such data are sent to drivers AT in the form of serialized and synchronous outgoing frames of samples analogous to the incoming frames present on connection 2 and advantageously comprising an equal number of time slots.

Reference IF denotes a unit according to our invention interfacing the synchronous part of the system, formed by sensor and driver matrices SE and AT, and the asynchronous part represented by computer EL.

Interface IF must receive synchronous data from sensors SE through connection 2 and send them in asynchronous form to computer EL through a connection 5; at the same time, unit IF must receive from computer EL asynchronous data through connection 5 and send them in synchronous form to drivers AT through connection 3.

Unit IF must have a working cycle comprising as many time slots as are present in the aforementioned incoming or outgoing frames; in each of these time slots a certain time interval will be available to unit IF for the operations required by the computer (asynchronous operations) whereas the remaining time will be available for synchronous operations, i.e. for the processing of the information coming from sensors SE or intended for drivers AT. The access of computer EL to unit IF is controlled by signals immediately allowing such access if the request arrives and can be satisfied in the time interval or phase allotted to the asynchronous operations; if the request arrives in the phase reserved for synchronous operations, it will be satisfied in the first phase allotted again to the computer. The structure of unit IF will be described in detail with reference to FIG. 2.

The operations of components IF, SE and AT may be controlled by a common time base. Alternatively, at least interface IF may have its own time base; in the latter case computer EL will control the synchronism between the time base of unit IF and the timing devices of assemblies SE and AT.

In the embodiment more particularly described hereinafter, unit IF is assumed to have its own time base.

Computer EL may be of any type known in the art; the choice will depend upon the type of procedure to be controlled as well as upon the purpose of the processing operations. More particularly, the computer may be a telephone-signal preprocessor which can be connected to a plurality of interfaces IF and is associated with a main computer controlling a plurality of preprocessors EL each advantageously designed as a microcomputer.

Connection 5 between unit IF and computer EL may consist of the common channels for data, addresses and control signals for the dialogue with the computer. Such channels, denoted by 5d, 5i and 5c in FIG. 2, are commonly referred to as buses.

Figure 2:
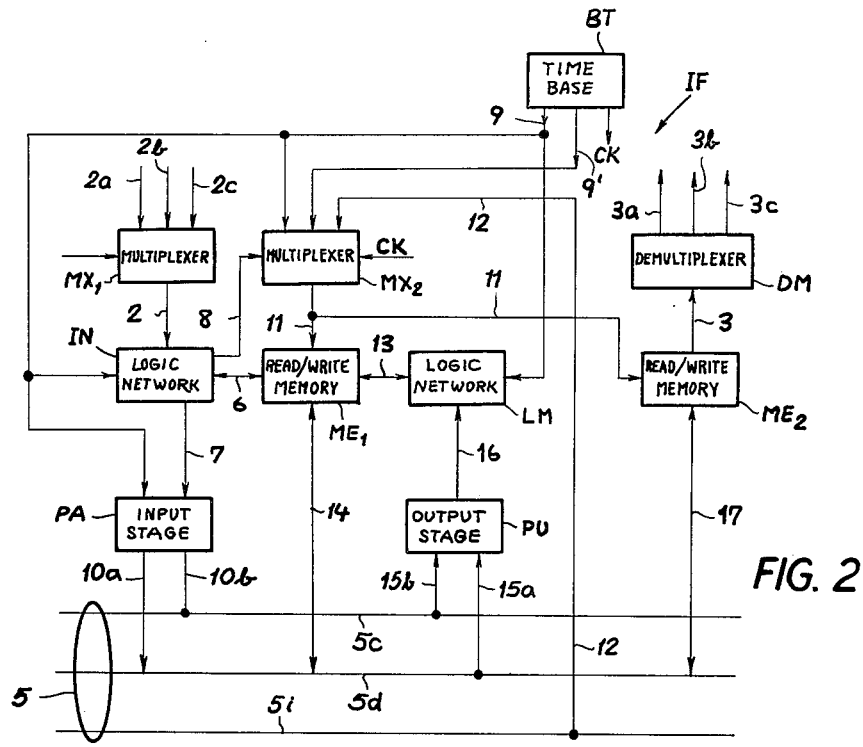
FIG. 2 is a more detailed block diagram of the interface shown in FIG. 1.

In FIG. 2, reference $MX_1$ denotes a conventional multiplexer; if data coming from several sets of sense matrices SE are to be sent through several connections 2a, 2b, 2c to a single computer EL, multiplexer $MX_1$ forms on its output 2 a single serialized and synchronous frame of incoming samples. The positioning of multiplexer $MX_1$ on its various inputs is controlled by the time base BT of the interface. If only a single set of sense matrices is used, the multiplexer obviously becomes redundant.

Reference IN denotes a logic network able to effect the digital integration of signals arriving from sensors SE through connection 2 and multiplexer $MX_1$ (if any), in order to distinguish between true state transitions at the scanned points of equipment RT and spurious transitions or noises. To this end, network IN co-operates with an incoming-signal memory $ME_1$, which will be described hereinafter, via a connection 6. The structure of logic IN will be described with reference to FIG. 3.

At the end of the integration operations pertaining to a given point of equipment RT, integrating logic IN can emit on a connection 7 a signal of "transition occurred". For some points (or even for all points), however, the emission of these signals can be disabled for one or both (low-high and high-low) types of transition, as will be explained hereinafter.

By this disabling operation (hereinafter referred to as "masking"), bus 5 of the computer EL is not engaged to inform the computer about transitions that at the moment are not significant, e.g. because a certain transition has not taken place at a point by which the "masked" ones are controlled.

In case a plurality of devices like unit IF are connected to the computer, such a point can also be connected to an interface different from the one which processes the "masked" points.

Moreover, in case the integration operations concern samples obtained from a point already processed during the same cycle, network IN emits on a connection 8 a signal conditioning the addressing of memory $ME_1$ as will be explained hereinafter.

A conventional input stage PA, receiving signals of recognized transitions from network IN through connection 7, supplements these signals with an address code (supplied by time base BT through a connection 9) identifying the sensor which has detected the transition, adapts the logic levels of the received signals to those necessary for computer operation, and sends to computer EL, through a connection 10a and data bus 5d, messages of recognized transition. A connection 10b, joined to control bus 5c, allows computer EL to request information present in stage PA, or allows that stage to signal to the computer that it has information to give.

Incoming-signal memory $ME_1$ is a conventional read/write memory which may consist of an area of the memory of the computer (not shown in the drawing). Memory $ME_1$ has a section assigned to each scanned point of equipment RT (FIG. 1) and is designed to store the evaluation criteria necessary to process the samples arriving from sense matrices SE. More particularly, each memory section stores the state of the corresponding point detected at the last scanning, information concerning the number of integration steps carried out, and information relating to the masking operation.

Memory $ME_1$ is cyclically read and written, at addresses provided by time base BT, and can be read assynchronously by computer EL (FIG. 1). To allow this dual operation, write and read addresses are supplied to the memory through an output connection 11 of a multiplexer $MX_2$ which has a first input connected, through link 9, to time base BT and a second input connected, through a link 12, to address bus 5.

The positioning of multiplexer $MX_2$, acting as a switchover means, on either input is controlled, during each time slot of the working cycle of the interface, by time base BT.

While multiplexer $MX_2$ is positioned on input 9 connected to time base BT, the codes relating to integration and masking are read and written in memory $ME_1$. The first information is conveyed by connection 6; the second appears on a connection 13 which links memory $ME_1$ to a logic network LM, controlling the masking, which will be described hereinafter. This connection between memory $ME_1$ and logic networks LM, IN makes it unnecessary to engage the computer bus to carry out read/write operations required by these networks.

The connection between multiplexer $MX_2$ and time base BT must take into account the above-mentioned possibility that one or more scanned points of equipment RT must supply information more than once during the same exploration cycle (i.e. they are connected to several sensors). This means that at different time slots in a given cycle it might be necessary to read or write in the same section of memory $ME_1$; to this end, every time the integration concerns a sample pertaining to a point already processed in the same cycle, the address code of the individual memory section associated with this point is imposed upon the input of multiplexer $MX_2$ by the signal present on connection 8. Such as address code will correspond to that sensor associated with the point which first transmits information to unit IF in the operating cycle.

The way in which such address may be imposed depends on the manner in which the scanned points have been connected to the sensors and is part of the usual circuit design. By way of example, the sensors associated with the same point may be arranged so that their addresses differ only in the most significant bits. Such an arrangement allows to keep by the simplest means a constant sampling frequency; in this case, multiplexer $MX_2$ may have a further input 9', also connected to time base BT, to which only the wires of line 9 which transfer the less significant bits of the address codes are connected. Under ordinary conditions (i.e. as concerns points connected to one sensor only or upon the first scanning of a point), multiplexer $MX_2$ can be positioned on input 9; on the other hand, in the presence of a signal coming from network IN on connection 8, the multiplexer will be positioned on input 9' to receive an address code common to all the sensors associated with the same point.

The reading in memory $ME_1$ of data relating to several scanned points in equipment RT may take place during the connection of output 11 of switchover means $MX_2$ to the computer, i.e. in an asynchronous phase of a time slot; such reading will be actually performed if memory $ME_1$ has received the corresponding reading request from computer EL through connection 14, whereupon data read in the memory are sent to the computer through the same connection 14 and data bus 5d.

Reference PU denotes a conventional output stage of the computer EL which receives from it, through data bus 5d and a connection 15a, information relating to the operations to be carried out by the interface IF on the signals coming from sense matrices SE; more particularly, such information will relate to the masking. Through control bus 5c and a connection 15b, stage PU receives the commands for loading that information.

Stage PU converts messages into signals having a level suitable for processing in interface IF; through a connection 16 it transfers such signals to logic network LM, which updates in memory $ME_1$ the information indicating the masking conditions for each scanned point. The structure of network LM will be described in detail with reference to FIG. 4.

Reference $ME_2$ denotes a second read/write memory advantageously formed by an area of the memory of the computer; memory $ME_2$ stores the control signals to be sent to the periphery, i.e.: logic levels required by the drive matrices AT to generate signals for the controlled points; possible synchronism signals for the timers of sense and drive matrices; and the information generally necessary for the control of the proper operation of the periphery itself. Outgoing-signal memory $ME_2$ is asynchronously read and written by computer EL; a connection 17, joined to data bus 5d, conveys between memory $ME_2$ and computer EL the data read or to be written in that memory.

Memory $ME_2$ is cyclically read, under the control of time base BT, so as to furnish on its output connection 3 serialized and synchronous outgoing sample frames.

Writing and reading addresses of memory $ME_2$ are supplied by multiplexer $MX_2$ through connection 11; therefore, its addressing rules are identical to those of incoming-signal memory $ME_1$ so that for memory operations pertaining to the transfer of samples to drive matrices it is also unnecessary to engage the computer bus.

The joint addressing of memories $ME_1$ and $ME_2$ allows a considerable simplification of time base BT, provided that the interface IF is arranged to process an equal number of sensors and drivers and that the addresses of the points to be more frequently explored correspond for instance to drivers which are not connected in circuit.

Reference DM denotes a possible demultiplexer of conventional type; in case the system comprises more than one group of drivers AT (FIG. 1), demultiplexer DM distributes the samples of the single frame present on line 3 among the several groups via a plurality of connections 3a, 3b, 3c similar to connection 3.

The outputs of time base BT include the connections 9 and 9' which emit signals determining, in the operating cycle of unit IF, the sequence of time slots designed for processing individual incoming and outgoing samples (e.g. addressing signals for memories $ME_1$, $ME_2$); output CK of time base BT emits the remaining timing signals, which control the operation of switches $MX_1$ and DM, the alternation in each time slot of the phases allotted to synchronous and asynchronous operations, and, for the latter, the alternation of reading and writing in the memory.

Figure 3:
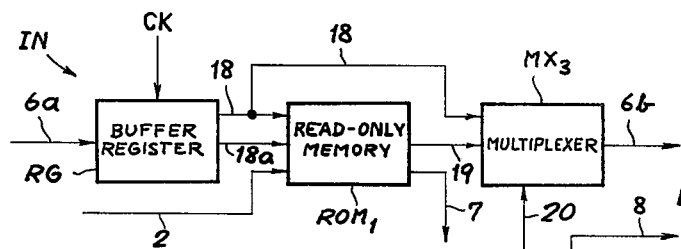
FIG. 3 is a block diagram of integration logic included in that interface.

FIG. 3 shows logic network IN inserted between two unidirectional lines 6a, 6b jointly constituting the connection 6 of FIG. 2.

Reference RG denotes a conventional buffer register which temporarily retains data read by network IN (FIG. 2) in memory $ME_1$; thus, register RG preserves on its outputs the data present at its input 6a for the entire time necessary for integration. Data loaded into the buffer register under the control of time base BT consist of the state of the point scanned in the last exploring operation, of integration counting bits, and of masking bits.

The state of the scanned point and the counting bits are presented by register RG on a connection 18 whereas masking bits are presented on a connection 18a.

The output 18 of register RG forms also one of the inputs of a multiplexer $MX_3$, whose functions will be described hereinafter.

Reference $ROM_1$ denotes a read-only memory wherein there are stored integration codes including the possible configurations relating to the state of the scanned circuit points, the integration counting, and the masking instructions. Memory $ROM_1$ is jointly addressed by data present on the outputs 18, 18a of register RG and by the sample present on connection 2; this memory emits on a connection 19 the updated state of the scanned point and on connection 7 the signals, if any, denoting the recognized transition and the type of transition occurred. Elements RG, $ROM_1$ and $MX_3$ lie in a feedback loop of memory $ME_1$ formed by connections 6a and 6b.

Connection 19 extends to a second input of multiplexer $MX_3$ which is therefore able to send to memory $ME_1$ (FIG. 2), through connection 6b, either the updated information on the state of the scanned point, processed in memory $ROM_1$, or the data read in memory $ME_1$ and present on connection 18; the positioning of multiplexer $MX_3$ on either input is controlled by the signal coming from a second read-only memory $ROM_2$ through a connection 20.

Memory $ROM_2$, which is addressed by time base BT through connection 9, stores the information pertaining to the integration threshold required by individual points, i.e. the information concerning the frequency at which the samples furnished by the various drivers must be taken into account for integration purposes.

Thus, integration can be made independent of the frequency at which data present at the individual points are sampled.

According to the address scanned by time base BT, output 20 will carry a signal positioning multiplexer $MX_3$ on its input 19, if the sample present in this time slot on connection 2 is to be taken into account for integration purposes, or on its input 18, if this sample may be neglected. Moreover, memory $ROM_2$ has a further output, consisting of connection 8, on which, as already stated, a signal will be present when time base BT addresses a driver corresponding to a point already explored during the same operating cycle.

The operation of the integration logic IN is as follows:

When time base BT scans the address of a particular sense matrix in a synchronous phase of a time slot, the sample coming from that matrix arrives via connection 2 at memory $ROM_1$.

At the same time there are read in memory $ROM_2$, at this address, instructions specifying whether the sample corresponds to a point already processed in this cycle of operation and whether it is to be taken into account for integration purposes.

The first instruction, fed to multiplexer $MX_2$ via line 8 as described above, establishes the address at which the previous state of the scanned point and a possible masking code are to be read in memory $ME_1$; the second instruction, appearing on line 20, positions multiplexer $MX_3$ on either input thereof depending on whether the sample may be neglected or must be integrated.

In the former case the data present on connection 18 are sent back unchanged to memory $ME_1$ (FIG. 2).

In the latter case the information read in memory $ME_1$ and presented by register RG to memory $ROM_1$ on connections 18, 18a addresses in memory $ROM_1$ a cell storing the present state of the point, the updated integration count and, in the case of a transition which is to be signaled to computer EL (FIG. 1), the corresponding signal.

The updated information on the state of the point, read in memory $ROM_1$, sent to memory $ME_1$ through connection 19, multiplexer $MX_3$ and connection 6b; the signal of recognized transition, if present, is sent out on connection 7.

Then the logic network IN is ready to integrate the subsequent sample.

Figure 4:
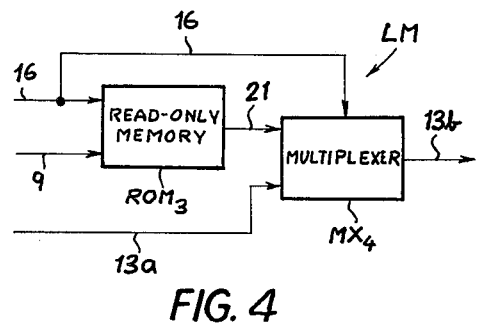
FIG. 4 is a block diagram of masking logic also included in that interface.

In FIG. 4, showing details of logic network LM, references 13a, 13b denote two groups of unidirectional wires that together form the connection 13. A further read-only memory $ROM_3$ stores the possible masking configurations or codes (no masking, partial masking or total masking) for the monitored points.

For the sake of simplicity and economy, such configurations will generally be limited to a few cases, defined in each instance on the basis of the specific application. Possible cases are: total masking, total masking with the exception of a point which starts the entire processing procedure in the interface IF, or alternate masking of groups of points depending on the operational phases.

Memory ROM$_3$ is addressed jointly by stage PU and time base BT; stage PU establishes, through connection 16, the overall masking configuration whereas time base BT controls through connection 9 the reading of information concerning the individual points.

Reference MX$_4$ denotes a conventional two-input-and-one-output multiplexer. Its two inputs are respectively connected to wire multiple 13a and to a connection 21 forming the output of memory ROM$_3$; the output of multiplexer MX$_4$ is connected to wires 13b. This multiplexer is positioned on its second input 21 when a signal arrives from connection 16; otherwise it remains on its first input 13a. Connections 13a and 13b, accordingly, form another feedback loop of memory ME$_1$ including elements ROM$_3$ and MX$_4$.

The operation of network LM is as follows:

In each time slot of the operating cycle the masking criteria for the individual points are read in memory ME$_1$ (FIG. 2) and transferred to network LM through connection 13a (FIG. 4).

As long as no message requesting a modification of the masking code previously stored in memory ME$_1$ arrives from stage PU, multiplexer MX$_4$ is positioned on its input 13a and thus transfers to its output 13b the information read in memory ME$_1$ (FIG. 2).

The instants of variation of the configuration depend on the process which is to be controlled; more particularly, they may depend both upon the state variation of non-masked points and upon other external conditions, as for instance commands generated by the operator or by the computer, or upon other circumstances which may generate state variations inside the computer.

When one of these circumstances occurs, logic LM (FIG. 2) receives from stage PU, through connection 16, the corresponding message; multiplexer MX$_4$ (FIG. 4) is switched to its input 21 and is ready to supply to memory ME$_1$ the information which will be read in memory ROM$_3$.

Such a message will consist of a certain sequence of bits which will address in memory ROM$_3$ the section corresponding to the new configuration.

Bits stored in this section (one or more for each scanned point in equipment RT) will be read upon order of the time base and written in the cells of memory ME$_1$ corresponding to the various points.

Upon termination of the reading operations in memory ROM$_3$, i.e. at the end of an operating cycle, multiplexer MX$_4$ is reset on its input 13a and remains there until the arrival of a subsequent message from stage PU.

The overall operation of the interface according to our invention will now be described.

At the beginning of the operation, writing takes place in corresponding cells of each section of memory ME$_1$ (FIG. 2), with the modalities described with reference to FIG. 4, of the instructions relating to the initial masking configuration of the explored points. Interface IF is then ready for steady operation. During this steady operation, the samples sent in sequence for sensors SE through connection 2 and multiplexer MX$_1$ (if provided) arrive at the input of integrating logic IN. In every sensor-exploring cycle, in the synchronous phases in which memory ME$_1$ is addressed by time base BT, this logic reads in memory ME$_1$ the previous state of the scanned points, which it compares with the present state in order to update, if necessary, the contents of memory ME$_1$. Moreover, whenever network IN recognizes a transition in the state of the scanned point, it sends onto output connection 7 (FIG. 2) the signal of recognized transition, if the masking configuration requires this transition to be communicated to computer EL (FIG. 1). The modalities by which the integration occurs have already been described with reference to FIG. 3.

The signal of recognized transition is received by stage PA (FIG. 2) and utilized as an instruction for loading the address given out at this moment by time base BT. The information of recognized transition and the address code furnished by the time base are joined into a message which is sent to computer EL through connection 10a and bus 5d; the message-sending modalities depend on the nature of stage PA and computer EL.

The computer, upon receiving this message, interprets it and operates according to the kind of procedure it has to control; these operations may or may not concern again the interface IF.

While processing the information arriving on connection 2, unit IF sends signals to driven matrices AT and carries out the other operations required by the processing program, e.g. the reading in memories ME$_1$, ME$_2$ or a modification of masking codes. To send samples to the drive matrices, it is first necessary to load the memory ME$_2$; thus, during the asynchronous phases in which multiplexer MX$_2$ is positioned on its input 12, computer EL addresses memory ME$_2$ through bus 5, connection 12, multiplexer MX$_2$ and connection 11, and at the same time it sends data to be written at the chosen addresses through bus 5d and connection 17. Memory ME$_2$ is then read in a synchronous manner upon command of the time base, which furnishes reading addresses in the intervals in which multiplexer MX$_2$ is positioned on its input 9. Read-out data are transferred onto connection 3 in the form of a synchronous outgoing frame and, through demultiplexer DM, are sent to their respective drivers AT in which logic signals will be converted into the form required by the units of equipment RT (FIG. 1).

The other operations requested by computer EL and concerning unit IF, e.g. reading in memory ME$_1$ or ME$_2$, always take place in the asynchronous phase allotted to the computer in each time slot of the operating cycle.

Thus, if a reading in either of these memories in necessary, computer EL sends, with the modalities considered in the previous case, the addresses of the memory sections to be read and, through bus 5d and connection 14 or 17, respectively, the request for a reading in memory ME$_1$ or ME$_2$. If, on the other hand, a masking state must be modified, the computer sends the corresponding message to network LM through bus 5d, connection 15a, stage PU and connection 16; as a consequence, network LM updates the state of the masking cells in each section of memory ME$_1$, according to the modalities previously considered.

It is evident that, while memory ME$_1$ is being updated, transition messages may arrive from network IN even for points that are to be masked with the new configuration; computer EL must take into account this temporary situation.

From the description given above it will be apparent that the operations concerning the detection of the state of circuit points, which are the most complicated procedures, are completely carried out by the interface so that the computer receives more significant information that therefore requires shorter processing time. Moreover, in spite of the fact that unit IF utilizes for its storing operations some areas of the memory of the computer, the engagement of bus 5 by this unit is very limited; in fact, not only does the access to the memory for the interface operation not require any engagement of the bus but also, owing to the presence of the masking criteria, this engagement occurs only when unit IF must communicate information really necessary to the processing operation. Thus, more time is granted to computer EL for more sophisticated tasks.

Finally, the particular structure of the logic networks of integration and masking, realized through the use of read-only memories, makes the interface very flexible and allows it readily to adapt itself to modified situations in peripheral devices RT, SE, AT.

We claim:

1. In a telecommunication system wherein a processor receives information on the state of circuit points periodically scanned by respective sensors identified by address codes read out in corresponding time slots of an operating cycle of a time base, in combination:
   incoming-signal memory means with sections respectively identified by the address codes of corresponding sensors for the storage of evaluation criteria pertaining to the associated circuit points, said address codes arriving at an address input of said incoming-signal memory means;
   logical circuitry connected to said sensors for receiving signal samples therefrom in corresponding time slots under the control of said time base, said logical circuitry being further connected to said incoming-signal memory means for evaluating the received signal samples and converting same into change-of-state signals on the basis of the evaluation criteria stored in respective sections of said incoming-signal memory means;
   output means controlled by said time base and connected to said logical circuitry for delivering said change-of-state signals together with the corresponding address codes to said processor; and
   updating means in said logical circuitry connected to said processor for modifying the evaluation criteria stored in any section of said incoming-signal memory means.

2. The combination defined in claim 1 wherein said evaluation criteria include integration codes and masking codes, said logical circuitry comprising an integration-code store inserted in a first feedback loop of said incoming-signal memory means, said updating means comprising a masking-code store inserted in a second feedback loop of said incoming-signal memory means.

3. The combination defined in claim 2 wherein said integration-code store is a first read-only memory connected to said output means for delivering said change-of-state signals to said processor, said logical circuitry further including a second read-only memory containing switching codes for bypassing said first read-only memory in the presence of certain of said address codes whereby an integration code written in a corresponding section of said incoming-signal memory means is recirculated unchanged to the same section via said first feedback loop.

4. The combination defined in claim 3 wherein at least one of said circuit points is associated with a plurality of said sensors emitting signal samples in different time slots of an operating cycle, said second read-only memory being operable to emit a switching code for the control of multiplexer means bypassing said first read-only memory in the presence of an address code allocated to a sensor forming part of said plurality of sensors.

5. The combination defined in claim 4, further comprising switch means controlled by said second read-only memory, upon detection of an address code allocated to a sensor forming part of said plurality of sensors, for connecting said address input to an input of said time base carrying an address code common to said plurality of sensors.

6. The combination defined in claim 3, 4 or 5 wherein said masking-code store comprises a third read-only memory addressable by a code-modifying instruction from said processor and bypassed in the absence of such instruction whereby a masking code written in a corresponding section of said incoming-signal memory means is recirculated unchanged to the same section via said second feedback loop.

7. The combination defined in claim 1, 2, 3, 4 or 5 wherein each time slot is divided into a synchronous phase and an asynchronous phase, further comprising switchover means controlled by said time base for connecting the address input of said incoming-signal memory means during a synchronous phase of each time slot to an output of said time base carrying the address codes of said sensors and during an asynchronous phase of each time slot to an address channel of said processor, the latter having a data channel with a direct connection to said incoming-signal memory means for receiving the contents of selected sections thereof during said asynchronous phase.

8. The combination defined in claim 7, further comprising a multiplicity of drivers for the selective control of associated circuit points, outgoing-memory means with sections respectively identified by said address codes for the storage of corresponding operating instructions to be read out to said drivers during time slots assigned thereto, said outgoing-signal memory means having an address input connectable by said switchover means during said synchronous phase to said output of said time base and during said asynchronous phase to said address channel, and loading means linking said outgoing-signal memory means with said processor for transferring to a selected section of said outgoing-signal memory means in said asynchronous phase of a time slot an instruction to be read out to the corresponding driver in said synchronous phase of another time slot.

9. The combination defined in claim 8 wherein said loading means forms part of a read/write connection between said outgoing-signal memory means and a data channel of said processor.

10. The combination defined in claim 8 wherein said processor comprises a microcomputer provided with a central memory, said incoming-signal memory means and said outgoing-signal memory means being part of said central memory.

* * * * *